(12) United States Patent
Makino

(10) Patent No.: US 8,189,094 B2
(45) Date of Patent: May 29, 2012

(54) IMAGE PROCESSING APPARATUS AND IMAGE PROCESSING METHOD

(75) Inventor: Jun Makino, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 371 days.

(21) Appl. No.: 12/642,401

(22) Filed: Dec. 18, 2009

(65) Prior Publication Data

US 2010/0171847 A1    Jul. 8, 2010

(30) Foreign Application Priority Data

Jan. 7, 2009    (JP) .................. 2009-001732

(51) Int. Cl.
*H04N 5/235*    (2006.01)
*H04N 9/68*    (2006.01)
*H04N 5/228*    (2006.01)

(52) U.S. Cl. ..... 348/362; 348/364; 348/234; 348/222.1; 348/229.1

(58) Field of Classification Search .................. 348/234, 348/223.1, 229.1, 221.1, 362, 364
See application file for complete search history.

(56) References Cited

U.S. PATENT DOCUMENTS

| | | | | |
|---|---|---|---|---|
| 7,029,437 B2 * | 4/2006 | Kobayashi | ............. | 600/180 |
| 7,375,758 B2 * | 5/2008 | Muramatsu | ............. | 348/364 |
| 7,623,179 B2 * | 11/2009 | Hsieh et al. | ............. | 348/364 |

FOREIGN PATENT DOCUMENTS

JP    02-033265 A    2/1990
JP    03-204281 A    9/1991

* cited by examiner

*Primary Examiner* — Jason Chan
*Assistant Examiner* — Joel Fosselman
(74) *Attorney, Agent, or Firm* — Canon USA Inc IP Division

(57) ABSTRACT

An image processing apparatus includes a luminance value calculation unit configured to calculate a luminance average value and a luminance peak value from an image obtained by image-capturing for each of frames formed by dividing one screen, a first calculation unit configured to combine the luminance average value and the luminance peak value obtained for each of the frames, a second calculation unit configured to calculate an average value of composite values equal to or more than a predetermined threshold value among composite values obtained by the first calculation unit, and a setting unit configured to set knee strength based on the average value of the composite values obtained by the second calculation unit.

11 Claims, 14 Drawing Sheets

FIG.4A

|   | 0 | 1 | 2 | 3 | 4 | 5 |
|---|---|---|---|---|---|---|
| 0 | 181 | 211 | 166 | 148 | 175 | 220 |
| 1 | 115 | 119 | 129 | 118 | 160 | 118 |
| 2 | 105 | 143 | 170 | 126 | 122 | 162 |
| 3 | 65 | 53 | 81 | 53 | 58 | 74 |

AVERAGE VALUE

FIG.4B

|   | 0 | 1 | 2 | 3 | 4 | 5 |
|---|---|---|---|---|---|---|
| 0 | 229 | 223 | 197 | 196 | 215 | 226 |
| 1 | 173 | 195 | 182 | 196 | 225 | 201 |
| 2 | 171 | 194 | 216 | 182 | 160 | 228 |
| 3 | 112 | 148 | 219 | 146 | 218 | 180 |

PEAK VALUE

FIG.4C

|   | 0 | 1 | 2 | 3 | 4 | 5 |
|---|---|---|---|---|---|---|
| 0 | 410 | 434 | 363 | 344 | 390 | 446 |
| 1 | 288 | 314 | 311 | 314 | 385 | 319 |
| 2 | 276 | 337 | 386 | 308 | 282 | 390 |
| 3 | 177 | 201 | 300 | 199 | 276 | 254 |

COMPOSITE VALUE

FIG.4D

|   | 0 | 1 | 2 | 3 | 4 | 5 |
|---|---|---|---|---|---|---|
| 0 | 410 | 434 |   |   | 390 | 446 |
| 1 |   |   |   |   | 385 |   |
| 2 |   |   | 386 |   |   | 390 |
| 3 |   |   |   |   |   |   |

COMPOSITE VALUE EQUAL TO OR
MORE THAN THRESHOLD VALUE

**EXAMPLE OF PEAK VALUE
LIGHT-METERING FRAME SETTING**

FIG.10A

|   | 0 | 1 | 2 | 3 | 4 | 5 |
|---|---|---|---|---|---|---|
| 0 | 181 | 211 | 166 | 148 | 175 | 220 |
| 1 | 115 | 119 | 129 | 118 | 160 | 118 |
| 2 | 105 | 143 | 170 | 126 | 122 | 162 |
| 3 | 65 | 53 | 81 | 53 | 58 | 74 |

AVERAGE VALUE

FIG.10B

|   | 0 | 1 | 2 |
|---|---|---|---|
| 0 | 229 | 197 | 226 |
| 1 | 194 | 219 | 228 |

PEAK VALUE

FIG.10C

|   | 0 | 1 | 2 | 3 | 4 | 5 |
|---|---|---|---|---|---|---|
| 0 | 229 | 229 | 197 | 197 | 226 | 226 |
| 1 | 229 | 229 | 197 | 197 | 226 | 226 |
| 2 | 194 | 194 | 219 | 219 | 228 | 228 |
| 3 | 194 | 194 | 219 | 219 | 228 | 228 |

CORRESPONDING PEAK VALUE

FIG.10D

|   | 0 | 1 | 2 | 3 | 4 | 5 |
|---|---|---|---|---|---|---|
| 0 | 410 | 440 | 363 | 345 | 401 | 446 |
| 1 | 344 | 348 | 326 | 315 | 386 | 344 |
| 2 | 299 | 337 | 389 | 345 | 350 | 390 |
| 3 | 259 | 247 | 300 | 272 | 286 | 302 |

COMPOSITE VALUE

FIG.10E

|   | 0 | 1 | 2 | 3 | 4 | 5 |
|---|---|---|---|---|---|---|
| 0 | 410 | 440 |   |   | 401 | 446 |
| 1 |   |   |   |   | 386 |   |
| 2 |   |   | 389 |   |   | 390 |
| 3 |   |   |   |   |   |   |

COMPOSITE VALUE EQUAL TO OR MORE THAN THRESHOLD VALUE

FIG.12A

|   | 0 | 1 | 2 | 3 | 4 | 5 |
|---|---|---|---|---|---|---|
| 0 | 181 | 211 | 166 | 148 | 175 | 220 |
| 1 | 115 | 119 | 129 | 118 | 160 | 118 |
| 2 | 105 | 143 | 170 | 126 | 122 | 162 |
| 3 | 65 | 53 | 81 | 53 | 58 | 74 |

AVERAGE VALUE

FIG.12B

|   | 0 | 1 | 2 | 3 | 4 | 5 |
|---|---|---|---|---|---|---|
| 0 | 229 | 223 | 197 | 196 | 215 | 226 |
| 1 | 173 | 195 | 182 | 196 | 225 | 201 |
| 2 | 171 | 194 | 216 | 182 | 160 | 228 |
| 3 | 112 | 148 | 219 | 146 | 218 | 180 |

PEAK VALUE

FIG.12C

|   | 0 | 1 | 2 | 3 | 4 | 5 |
|---|---|---|---|---|---|---|
| 0 | 229 | 223 |  |  | 215 | 226 |
| 1 |  |  |  |  | 225 | 201 |
| 2 |  |  | 216 |  |  | 228 |
| 3 |  |  | 219 |  | 218 |  |

CORRESPONDING PEAK VALUE

FIG.12D

|   | 0 | 1 | 2 | 3 | 4 | 5 |
|---|---|---|---|---|---|---|
| 0 | 181 | 211 |  |  | 175 | 220 |
| 1 |  |  |  |  | 160 | 118 |
| 2 |  |  | 170 |  |  | 162 |
| 3 |  |  | 81 |  | 58 |  |

AVERAGE VALUE

FIG.12E

|   | 0 | 1 | 2 | 3 | 4 | 5 |
|---|---|---|---|---|---|---|
| 0 | 181 | 211 |  |  | 175 | 220 |
| 1 |  |  |  |  | 160 |  |
| 2 |  |  | 170 |  |  | 162 |
| 3 |  |  |  |  |  |  |

AVERAGE VALUE EQUAL TO OR MORE THAN THRESHOLD VALUE

IMAGE PROCESSING APPARATUS AND IMAGE PROCESSING METHOD

BACKGROUND OF THE INVENTION

1. Field of the Invention

The present invention relates to an image processing apparatus and an image processing method for processing an image captured by a video camera or a digital camera, and more particularly to gradation correction of an image obtained by image-capturing.

2. Description of the Related Art

A conventional imaging apparatus such as a video camera or a digital camera obtains an image signal by using an image sensor such as a charge-coupled device (CCD) or a complementary metal-oxide semiconductor (CMOS). In such an image sensor, a range of gradation expression from black to white levels is narrow, and hence the obtained image signal cannot adequately express a gradation range of an image of a real object.

In a system that digitizes the image signal to record the signal, the gradation range is further restricted to an expression range of a digital signal. In order to solve this problem, knee processing is commonly performed, which widens the gradation range to be expressed by compressing a gradation of a high luminance area of the image signal.

Referring to FIG. 14, input/output characteristics and a gradation range of the knee processing will be described. In FIG. 14, a horizontal axis indicates a value of an input signal, while a vertical axis indicates a value of an output signal after the knee processing. Each straight line indicates input/output characteristics when the knee processing is changed.

When no knee processing is performed, input/output characteristic is expressed by a straight line a, and input/output signal values are equal to each other. In other words, a range of an input signal value Ia is equal to that of an output signal value Oa.

When knee processing is performed, the input/output characteristics change from the state of the straight line a to that of a straight-line b or a straight-line c. When the input/output characteristics are in the state of the straight-line b, until an input signal value Ib, as in the case of no knee processing, input/output signal values are equal to each other. On the other hand, in a high luminance area where an input signal value is equal to or more than the value Ib, a gradation of an output signal value is compressed and, as overall characteristics, a range of input signal values 0 to Ia is compressed to that of output signal values 0 to Ob.

Similarly, in the state of the straight line c, in a high luminance area of the value Ic or more, a gradation of an output signal is compressed and, as a whole, a range of input signal values 0 to Ia is compressed to that of output signal values 0 to Ic.

The application of the knee processing compresses the input signal values, resulting in a wider gradation range to be substantially expressed. Starting points kb and kc of broken lines in the characteristics are referred to as knee points, and a tilt equal to or more than the knee point is referred to as a knee slope. Generally, when the knee processing is strengthened, the knee point is lowered or the knee slope is made flat.

Through such knee processing, a gradation range is corrected for an image of an object in a backlight state or an image with a high luminance object. Depending on a state of the image of the object, a correction amount, i.e., knee strength, is set.

Japanese Patent Application Laid-Open No. 02-033265 discusses a method for setting knee strength by detecting an average value and a peak value for each field or frame and adding these values together at an appropriate ratio. Japanese Patent Application Laid-Open No. 03-204281 discusses a method for setting knee strength by using luminance signal levels obtained from a plurality of areas set on a screen.

However, the method discussed in Japanese Patent Application Laid-Open No. 02-033265 uses the average value and a maximum value of the entire screen. Hence, when a high luminance level causes overexposure in a certain area of the screen, appropriate detection cannot be performed.

The method discussed in Japanese Patent Application Laid-Open No. 03-204281 sets the knee strength by setting the plurality of areas on the screen. However, the screen includes various areas in which overexposure may occur. Hence, setting of an appropriate detection area is difficult.

Neither of Japanese Patent Application Laid-Open Nos. 02-033265 and 03-204281 has no reference to a case where a detection area to be set is made smaller.

SUMMARY OF THE INVENTION

The present invention is directed to an image processing apparatus and an image processing method that can perform highly accurate gradation correction by taking into account even a difference in brightness between local areas such as small areas in which overexposure occurs in an image of one screen obtained by image-capturing.

According to an aspect of the present invention, an image processing apparatus includes a luminance value calculation unit configured to calculate a luminance average value and a luminance peak value from an image obtained by capturing based on each of frames dividing one screen, a first calculation unit configured to combine the luminance average value and the luminance peak value obtained based on each of the frames, a second calculation unit configured to calculate an average value of composite values equal to or more than a predetermined threshold value among composite values obtained by the first calculation unit, and a setting unit configured to set knee strength based on the average value of the composite values obtained by the second calculation unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A to 4D illustrate numerical value examples according to the first exemplary embodiment.

FIGS. 10A to 10E illustrate numerical value examples according to the second exemplary embodiment.

FIGS. 12A to 12E illustrate numerical value examples according to the third exemplary embodiment.

DESCRIPTION OF THE EMBODIMENTS

Various exemplary embodiments, features, and aspects of the invention will be described in detail below with reference to the drawings.

Figure 1:
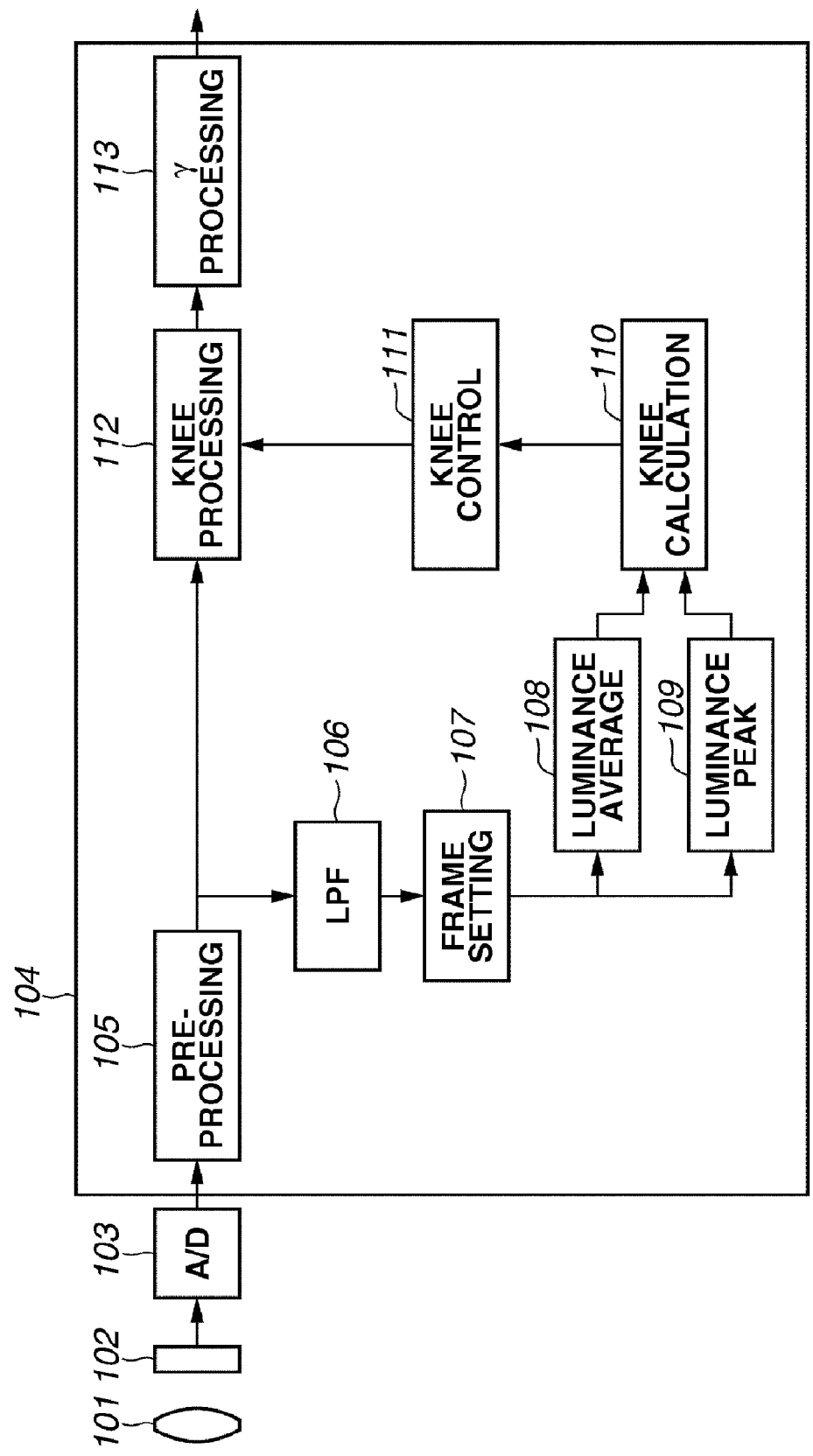
FIG. 1 is a block diagram illustrating a configuration of an imaging apparatus according to a first exemplary embodiment of the present invention.

FIG. 1 is a block diagram schematically illustrating a configuration of an image processing apparatus (a digital video camera or a digital still camera) according to a first exemplary embodiment of the present invention.

In FIG. 1, the image processing apparatus includes a photographic lens 101, an image sensor 102 such as a CCD or a CMOS, and a camera signal processing unit 104. The image sensor 102 converts an image captured by the photographic lens 101 into an image signal, and an A/D conversion unit 103 further converts the image signal into a digital signal. The camera signal processing unit 104 performs signal processing on the converted image signal and outputs the signal as an image signal recordable in a recording medium (not illustrated).

The camera signal-processing unit 104 includes a pre-processing circuit 105, a knee processing circuit 112, and a gamma (γ) processing circuit 113. The pre-processing circuit 105 performs resolution conversion for the image signal output from the A/D conversion unit, and generates a luminance signal and color signal from the resolution-converted image signal. The pre-processing circuit 105 performs color adjustment processing for the generated color signal and additional processing on the generated luminance signal for the purpose of detection and outputting described below.

The generated luminance signal is input to both of an LPF 106 and the knee processing circuit 112. A color signal is output together with the knee-processed luminance signal from the camera signal-processing unit 104. However, description of this operation will be omitted.

The LPF 106 performs low-pass filter processing for the luminance signal. A frame setting circuit 107 sets a predetermined light-metering frame for an image of one screen to be used as a unit for each processing below. A luminance average circuit 108 calculates an average value of luminance signals for each light-metering frame. A luminance peak circuit 109 detects a peak value of luminance signals for each light-metering frame.

A knee calculation circuit 110 calculates knee strength to be set based on the luminance average value and the luminance peak value of each light-metering frame according to a calculation method described below. A knee control circuit 111 performs smoothing processing in a time direction based on a result of the processing of the knee calculation processing circuit 110 to determine knee characteristics to be applied to an actual luminance signal.

Figure 14:
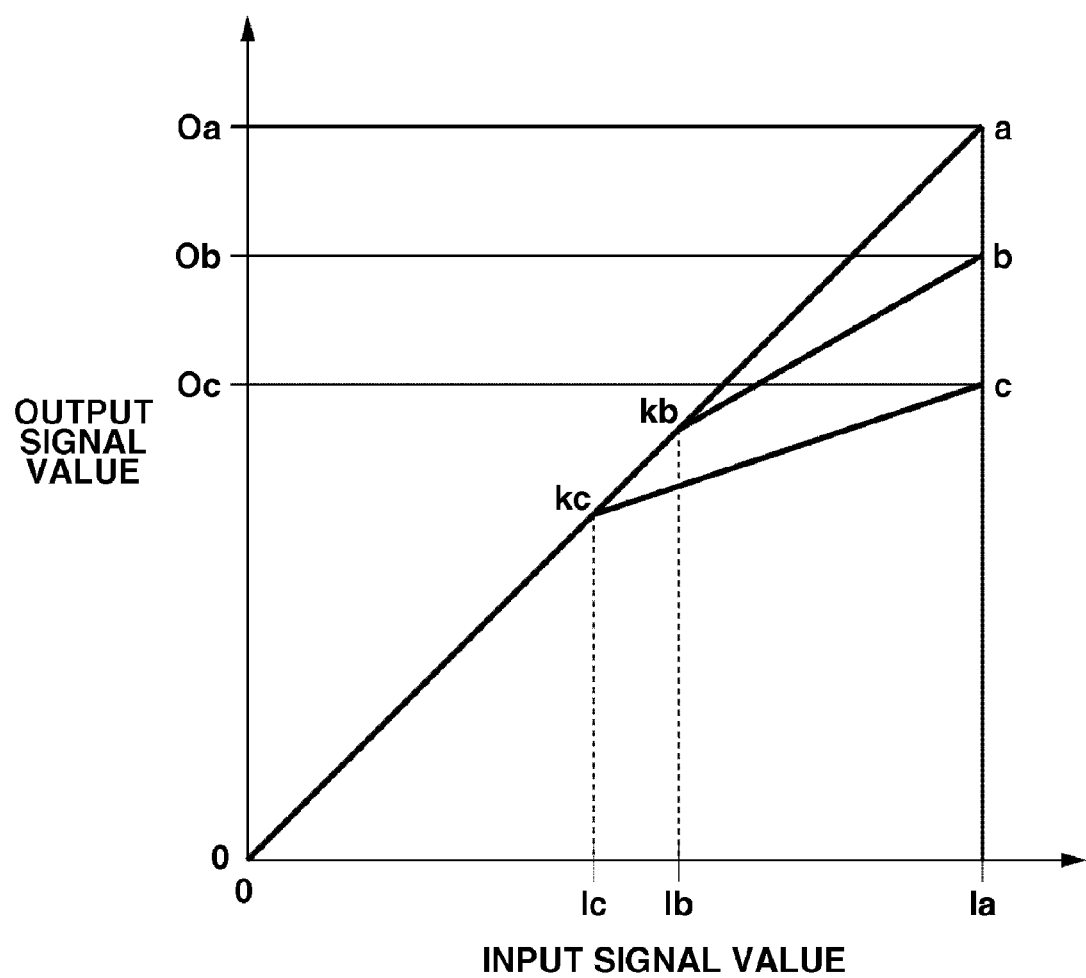
FIG. 14 illustrates knee characteristics.

The knee processing circuit 112 provides knee characteristics described above with reference to FIG. 14 to the luminance signal based an a result of the knee control of the knee control circuit 111. The γ processing circuit 113 performs predetermined γ processing different in gradation characteristics from the knee processing for the knee-processed luminance signal.

The circuits illustrated in FIG. 1 have been described above. However, the processing related to the present invention is not limited to the form of the exemplary embodiment using the dedicated processing circuits. For example, some of the processing operations according to the present invention may be executed as software processing. More specifically, a CPU (not illustrated) that performs overall control of the imaging apparatus may perform all or some of the detection and setting operations for the knee control from the LPF 106 to the knee control circuit 111.

Figure 2A:
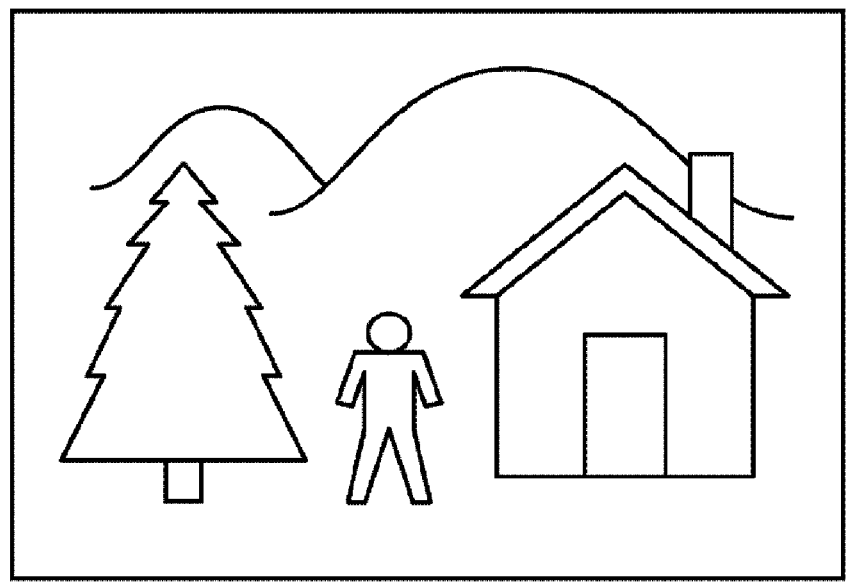
FIGS. 2A and 2B illustrate frame setting according to the first exemplary embodiment.
Figure 2B:
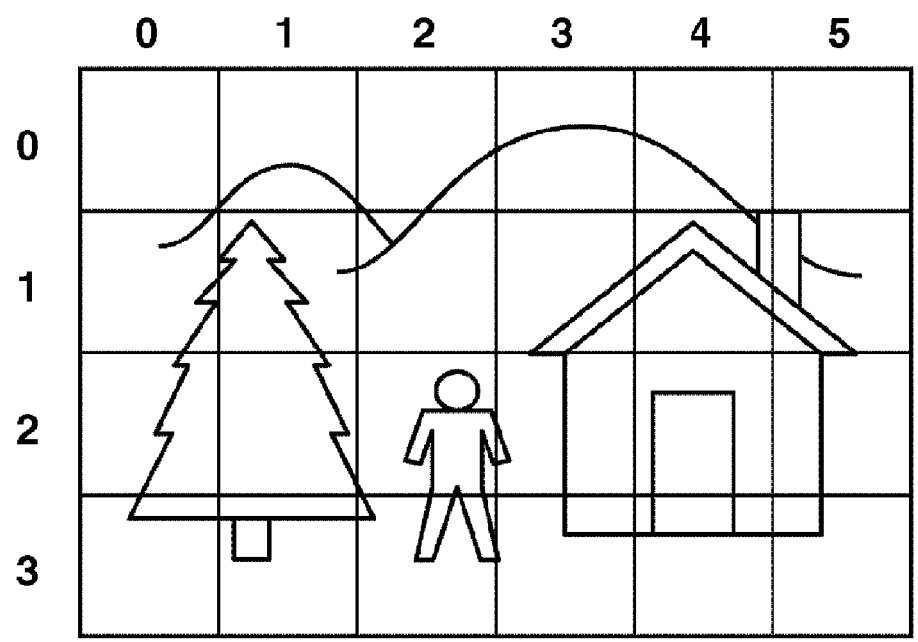

Referring to FIGS. 2A and 2B, frame setting of the exemplary embodiment will be described. FIG. 2A illustrates a captured image of one screen output from the pre-processing circuit 105. The frame setting circuit 107 divides the captured image by pixels to set light-metering frames. FIG. 2B illustrates an example of dividing the captured image into four columns vertically and six columns horizontally.

Numerical values outside the image indicate row and column numbers of the frames. In FIG. 2B, frames of 0th to 3rd rows and 0th to 5th columns are set. In the present exemplary embodiment, each light-metering frame is formed into a simplest fixed rectangular shape. However, the shapes of the light-metering frames are not limited to this. There is no need to set frames in entire pixels of the captured image. Frames may be set with margins of fixed widths. The number of light-metering frames may vary depending on the image size.

Next, referring to FIG. 3, a procedure of calculation processing of knee strength performed by the knee calculation circuit 110 will be described.

First, in step S301, the luminance average circuit 108 obtains an average value of luminance signals of included pixels for each light-metering frame. The luminance peak circuit 109 obtains a peak value of the luminance signals similarly for each light-metering frame. In step S302, the knee calculation circuit 110 combines the average value and the peak value that have been obtained for each light-metering frame to obtain a composite value.

For example, an average value Aij and a peak value Pij obtained from a light-metering frame of an i-th row and a j-th column are respectively multiplied by a predetermined coefficient a and a predetermined coefficient p to calculate a composite value Cij thereof. In this case, the composite value Cij is represented by the following expression (1):

$$C_{ij} = a \times A_{ij} + p \times P_{ij} \tag{1}$$

The coefficients "a" and "p" can be changed depending on predetermined conditions such as a photographic mode. In order to simplify calculation and to achieve a high speed, the coefficients may be set to 1.0 to perform simple addition.

In step S303, the knee calculation circuit 110 extracts frames whose composite values Cij are equal to or more than a predetermined threshold value Th0 to obtain a composite value Ta of an average value of the composite values Cij. In other words, a composite value Ta is obtained by the following expression (2) where n indicates a number of composite values equal to or more than the threshold value Th0:

$$Ta = \left( \sum_{C_{ij} > Tb0} C_{ij} \right) / n \quad (2)$$

In step S304, the knee calculation circuit 110 determines knee strength within a range of the obtained average composite value Ta. For example, by using Table 1 below, the knee calculation circuit 110 sets a scale of none, low, middle, and high for knee strength:

TABLE 1

| Composite value range | Knee strength |
| --- | --- |
| $0 \leq Ta < 375$ | None |
| $375 \leq Ta < 390$ | Low |
| $390 \leq Ta < 410$ | Middle |
| $410 \leq Ta$ | High |

The knee calculation circuit 110 transmits the determined knee strength to the knee control unit 111. The knee control circuit 111 uses the knee strength to control knee processing of the knee processing circuit 112.

Referring to FIGS. 4A to 4D, specific calculation examples of the knee calculation circuit 110 will be described.

In FIGS. 4A to 4D, the light-metering frames are set in an image as in the case of FIGS. 2A and 2B. In this image, FIG. 4A illustrates a result of calculating an average value for each light-metering frame, and FIG. 4B illustrates a result of calculating a peak value.

From these results, a composite value for each light-metering frame is obtained as illustrated in FIG. 4C. For example, in the case of a frame of a 0th row and a 0th column, an average value is "181" and a peak value is "229", and thus a composite value is "410".

When a threshold value is "380", light-metering frames having composite values exceeding the threshold value are as illustrated in FIG. 4D. More specifically, the light-metering frames having composite values exceeding the threshold value are seven light-metering frames of a 0th row and a 0th column, a 0th row and a 1st column, a 0th row and a 4th column, a 0th row and a 5th column, a 1st row and a 4th column, a 2nd row and a 2nd column, and a 2nd row and a 5th column.

The knee calculation circuit 110 averages the composite values of these frames. In other words, "(410+434+390+446+385+386+386)/7=405.86" is obtained. This value is within the range of "390<Ta<410" in the Table 1, and hence the knee strength is determined to be "middle".

Figure 5:
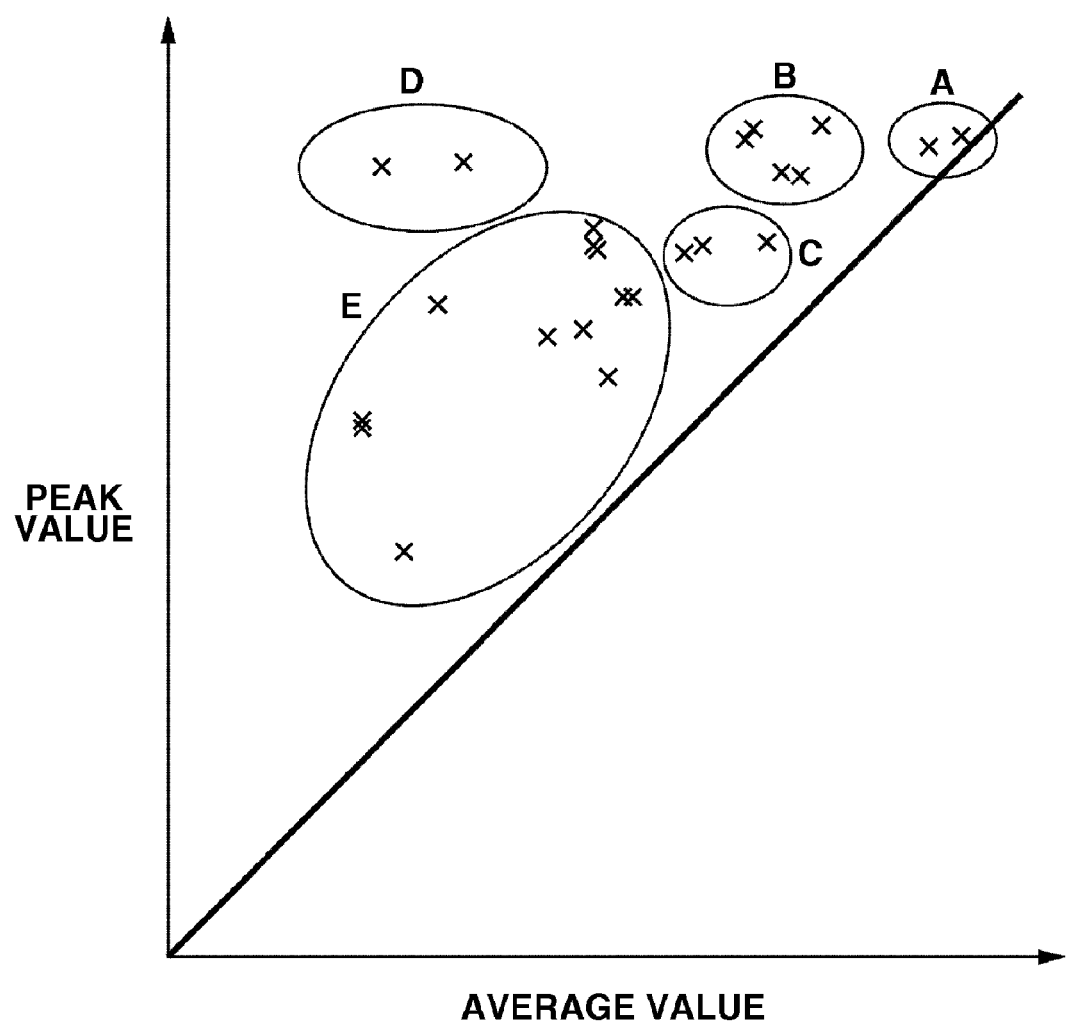
FIG. 5 illustrates relationship between an average value and a peak value according to the first exemplary embodiment.

Next, referring to FIG. 5, characteristics of an effect of overexposure detection according to the present exemplary embodiment will be described. FIG. 5 illustrates a correlation between an average value and a peak value obtained for each light-metering frame. A horizontal axis indicates an average value, and a vertical axis indicates a peak value. Each light-metering frame has a value "X".

In a range "A" of FIG. 5, an average value and a peak value are both high. In a frame included in this range, an image in the entire frame may be overexposed. This overexposed state has conventionally been easily detected by a detection method based on only an average value.

On the other hand, in a range B of FIG. 5, a peak value is high while an average value is slightly above a middle level. An image of a frame included in this range is overexposed. This state occurs because assuming that luminance values of almost all pixels in the light-metering frame are nearly equal to an average value, there are pixels of high luminance of nearly equal levels in the vicinity of a pixel that has generated a peak value.

In the case of the range B, the average value is not high, and hence detection of the overexposure by the conventional detection method based on only the average value is difficult. For example, in the examples of FIGS. 4A and 4B, in the light-metering frames of a 1st row and a 4th column, a 2nd row and a 2nd column, and a 2nd row and a 5th column, average values are 160 to 170 (i.e., not high), while peak values are 216 to 226 (i.e., high).

Thus, the method based on only an average value cannot detect overexposure of these frames. On the other hand, according to the present exemplary embodiment, the overexposure is detected based on the composite value, and hence overexposure of these frames can be detected.

In a range C of FIG. 5, an average value is nearly equal to that in the range B. However, a peak value is low. In this case, the low peak value indicates that there is no overexposed image, and hence almost no knee processing is needed.

In the case of detection by the conventional method based on only the average value, this area is included in a detection target. In the present exemplary embodiment, however, this range is excluded from the detection target. In other words, in the present exemplary embodiment, a range where there is no overexposed image is not used for setting knee strength, and hence more appropriate knee strength can be set.

In a range D of FIG. 5, a peak value is high while an average value is low. In this case, almost all pixel values of the light-metering frame are lower than an average, and only certain pixels have peak values. This range corresponds to, for example, a case where there is a luminescent spot in the dark. An area of a high luminance portion is small, and gradation improvement by knee processing is not so effective.

The detection based on only the peak value leads to erroneous detection of the range. In the present exemplary embodiment, however, such a range is not detected because detection is performed based on the composite value. In a range E of FIG. 5, since an average value and a peak value are both low, the knee processing is not necessary by its nature.

As described above, according to the present exemplary embodiment, the plurality of light-metering frames is set on the screen, and the luminance average value and the luminance peak value are obtained for each light-metering frame. Then, the luminance average value and the luminance peak value obtained for each light-metering frame are respectively multiplied by the predetermined coefficients to be combined, thereby obtaining the composite value.

The average value is obtained when the composite value obtained for each light-metering frame is equal to or more than the fixed threshold value, and the knee strength is set based on the average value. Thus, in the case of an image where overexposure occurs in a small area, gradation improvement by the knee processing can be achieved easily.

A second exemplary embodiment is directed to a case where a peak value light-metering frame is set based on a combination of a plurality of average value light-metering frames.

Figure 6:
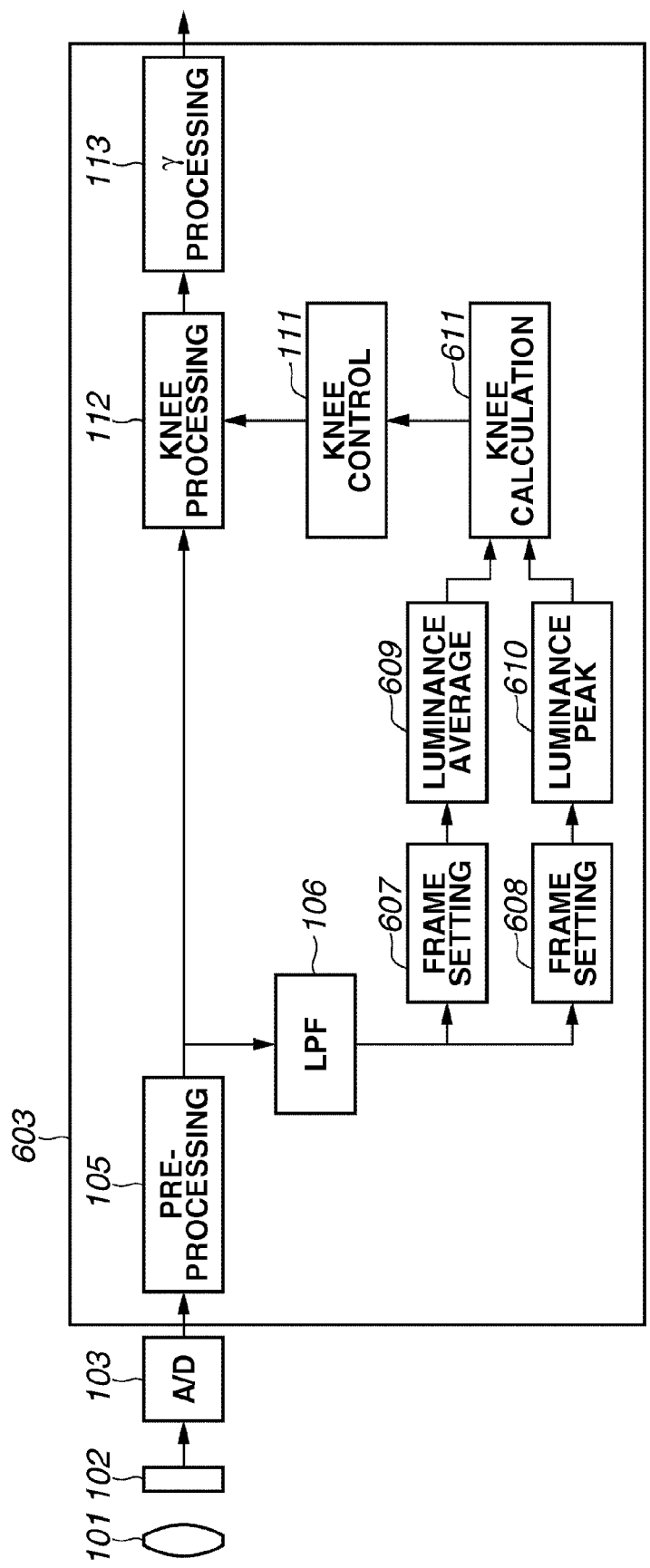
FIG. 6 is a block diagram illustrating a configuration of an imaging apparatus according to a second exemplary embodiment of the present invention.

FIG. 6 illustrates a configuration of an imaging apparatus according to the present exemplary embodiment. This exemplary embodiment is similar to the first exemplary embodiment except that setting of light-metering frames for an average value and a peak value are different. Thus, blocks of similar functions are denoted by the same reference numerals, and description thereof is omitted.

In FIG. 6, the imaging apparatus of the present exemplary embodiment includes a camera signal-processing unit 603. A frame setting circuit 607 sets a light-metering frame for an average value. A frame setting circuit 608 sets a light-metering frame for a peak value. A luminance average circuit 609 calculates an average value of luminance signals for each light-metering frame according to the frame setting of the frame setting circuit 607.

A luminance peak circuit 610 detects a peak value of luminance signals for each light-metering frame according to the frame setting of the frame setting circuit 608. A knee calculation circuit 611 calculates knee strength to be set based on a luminance average value output from the luminance average circuit 609 and a luminance peak value output from the luminance peak circuit 610 by a calculation method described below.

Figure 7A:
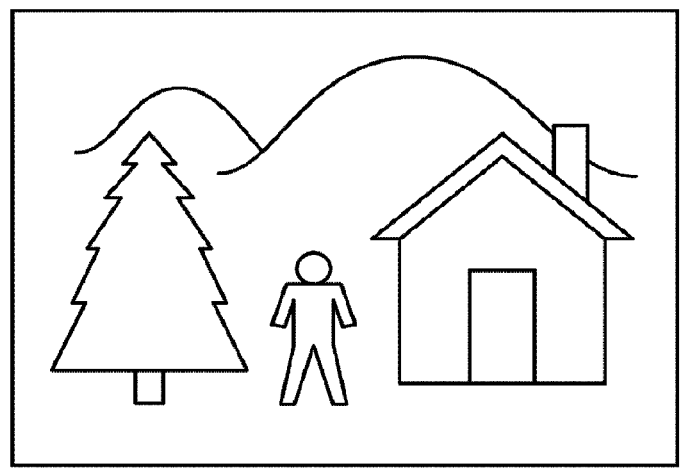
FIGS. 7A to 7C illustrate frame setting according to the second exemplary embodiment.
Figure 7B:
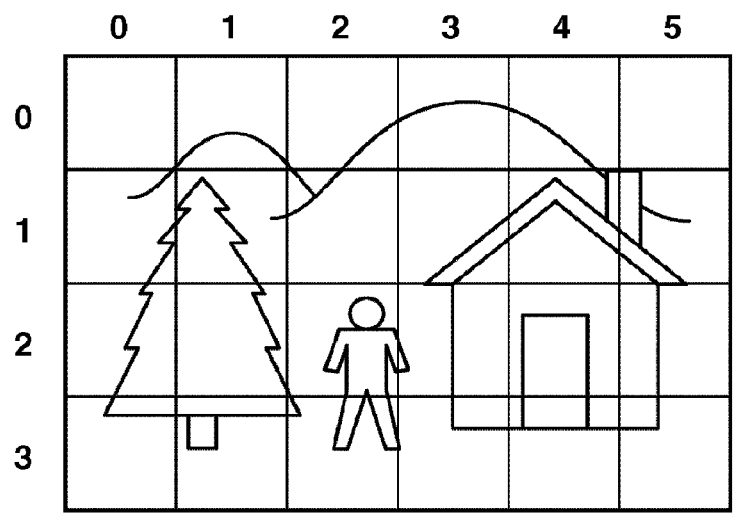
Figure 7C:
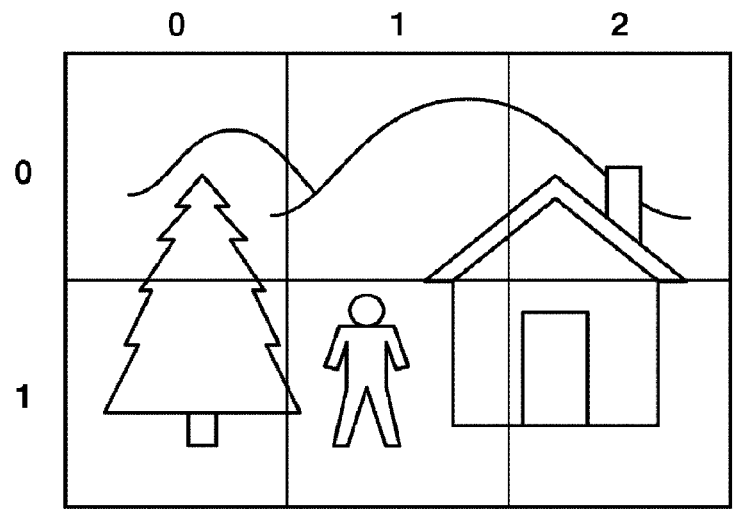

Referring to FIGS. 7A to 7C, the frame setting according to the present exemplary embodiment will be described. FIG. 7A illustrates a captured image of one screen output from a pre-processing circuit 105. The frame setting circuit 107 divides the captured image for luminance average value measurement as illustrated in FIG. 7B. FIG. 7B illustrates an example where an image is divided into four columns vertically and six columns horizontally to set an average value light-metering frame.

The same captured image is divided for luminance peak value measurement as illustrated in FIG. 7C. In the illustrated example, the image is divided into two columns vertically and three columns horizontally to set a peak value light-metering frame. In other words, the peak value light-metering frame is set larger than the average value light-metering frame based on a combination of a range of a plurality of average value light-metering frames.

As a result, there are 24 average values obtained by average value light-metering, while there are 6 peak values. The knee calculation circuit 611 and the knee calculation circuit 110 of the first exemplary embodiment include memories (not illustrated) configured to store these values for combining the luminance average value and the luminance peak value.

In the first exemplary embodiment, the memory needs storage capacity for storing 24 average values and 24 peak values. On the other hand, in the present exemplary embodiment, only 6 peak values are obtained, and hence a storage capacity can be reduced by an amount equal to 18 values.

Figure 8:
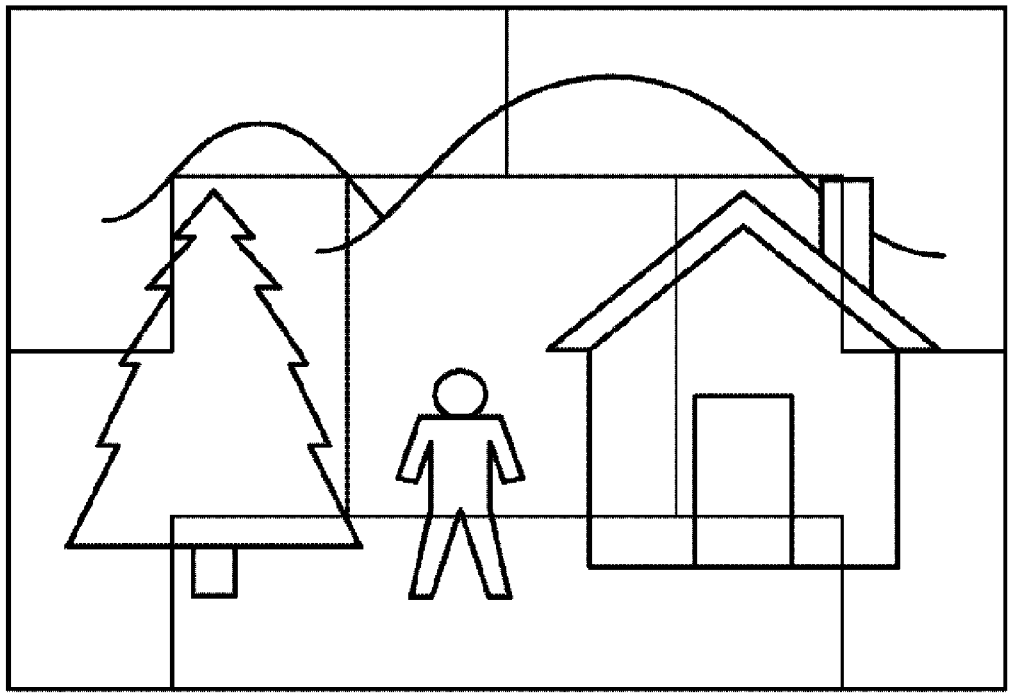
FIG. 8 illustrates another example of peak frame setting according to the second exemplary embodiment.

In FIGS. 7A to 7C, one peak value light-metering frame is set corresponding to a size of 2 rows and 2 columns of the average light-metering frame. It is not limited to this setting, and, frames of different sizes such as 1 row and 4 columns or 2 rows and 3 columns may be set. As illustrated in FIG. 8, a different shape may be set as a peak value light-metering frame.

FIG. 8 illustrates an example where a peak value light-metering frame is set in a different shape according to a position in the screen such as a center, an upper side, or a lower side of the screen. Thus, the peak value light-metering frame can be set based on a combination of average value light-metering frames according to a purpose/effect of peak value processing.

Figure 9:
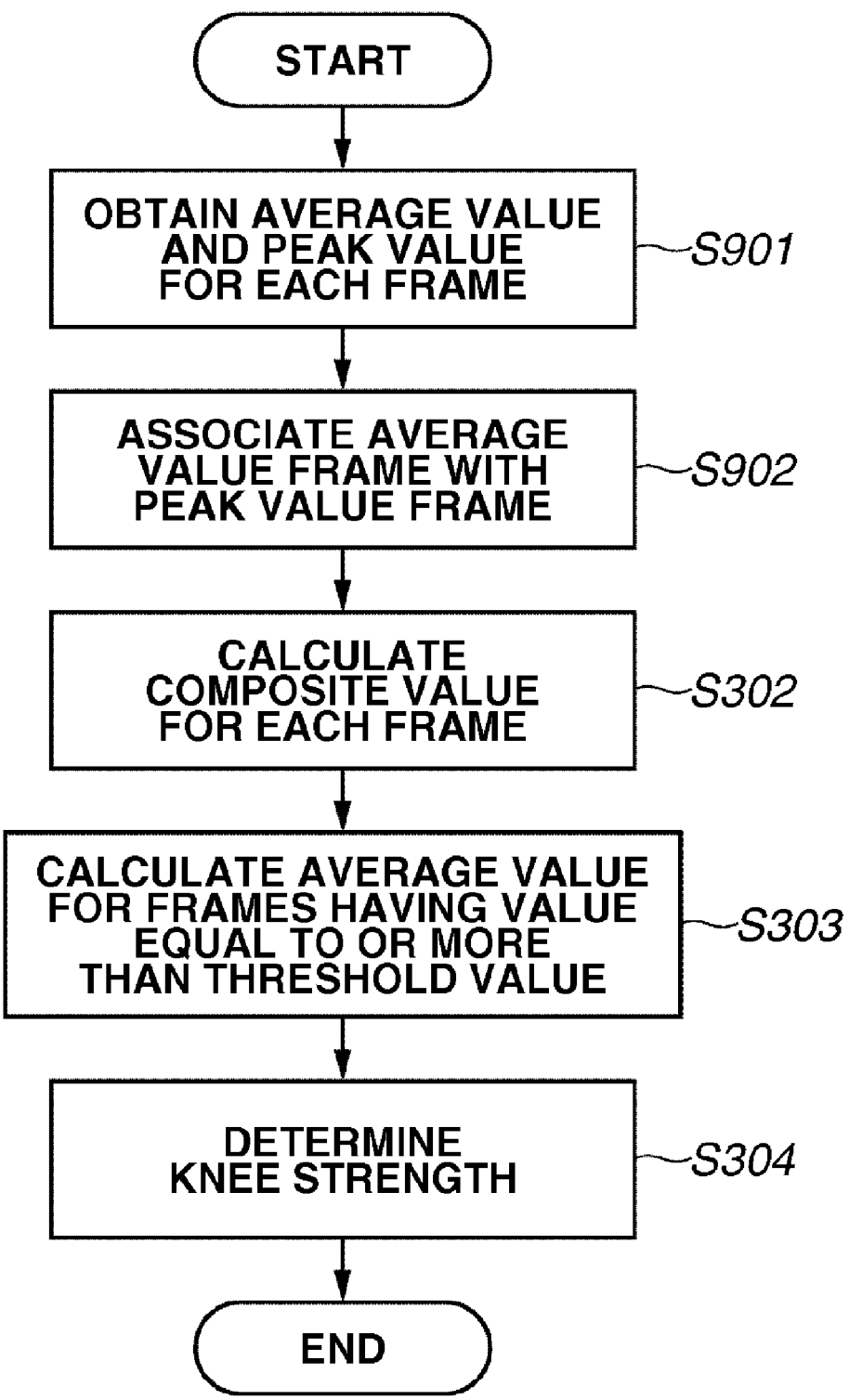
FIG. 9 is a flowchart illustrating an algorithm of knee calculation according to the second exemplary embodiment.

Next, referring to FIG. 9, a procedure of calculation processing of knee strength performed by the knee calculation circuit 611 when frame setting of FIGS. 7A to 7C is performed will be described. In FIG. 9, steps similar to those of the processing procedure described above with reference to FIG. 3 are denoted by the same numbers.

First, in step S901, an average value and a peak value of luminance signals are obtained for each light-metering frame. In other words, the luminance average circuit 609 obtains a luminance average value of the average value light-metering frames, and the luminance peak circuit 610 obtains a luminance peak value of the peak value light-metering frames. As descried above with reference to FIGS. 7A to 7C, in the present exemplary embodiment, an average value of 24 average value light-metering frames and a peak value of 6 peak value light-metering frames are obtained.

In step S902, a value of each average value light-metering frame is associated with a value of a peak value light-metering frame to obtain a set of an average value and a peak value for each average value light-metering frame.

In FIGS. 7A to 7C, for example, an average value of an average value light-metering frame of a 0th row and a 0th column is associated with a peak value of a peak value light-metering frame of a 0th row and a 0th column, and an average value of the average value light-metering frame of a 0th row and a 1st column is associated with a value of the peak value light-metering frame of the 0th row and the 0th column.

Similarly, an average value of the average value light-metering frame of a 0th row and a 3rd column is associated with a peak value of the peak value light-metering frame of a 0th row and a 1st column, and an average value of the average value light-metering frame of a 0th row and a 4th column is associated with a peak value of the peak value light-metering frame of the 0th row and the 1st column.

A peak value Pij corresponding to an average value light-metering frame of an i-th row and a j-th column can be calculated by the following expression (3) based on integer division "/", when a peak value Qk1 is obtained from a peak value light-metering frame of a k-th row and a 1-th column:

$$P_{ij} = Q_{(i/2)(j/2)} \qquad (3)$$

In other words, addresses k and j of the peak value light-metering frame corresponding to addresses i and j of the average value light-metering frame are obtained from i/2 and j/2 (division of i and j by 2). In FIGS. 7A to 7C, the average value light-metering frames of 2 rows and 2 columns are combined to set one peak value light-metering frame, and hence association processing is simplified.

When the value of the average value light-metering frame is associated with the value of the peak value light-metering frame, the peak value may be multiplied by a coefficient defined corresponding to its position. Thus, which overexposure on the screen should importantly be corrected can be adjusted.

Especially, when peak light-metering frames are set in different shapes according to positions on the screen as in the case of the example of FIG. 8, the degrees of importance of the center and the surroundings can be easily determined.

Figure 3:
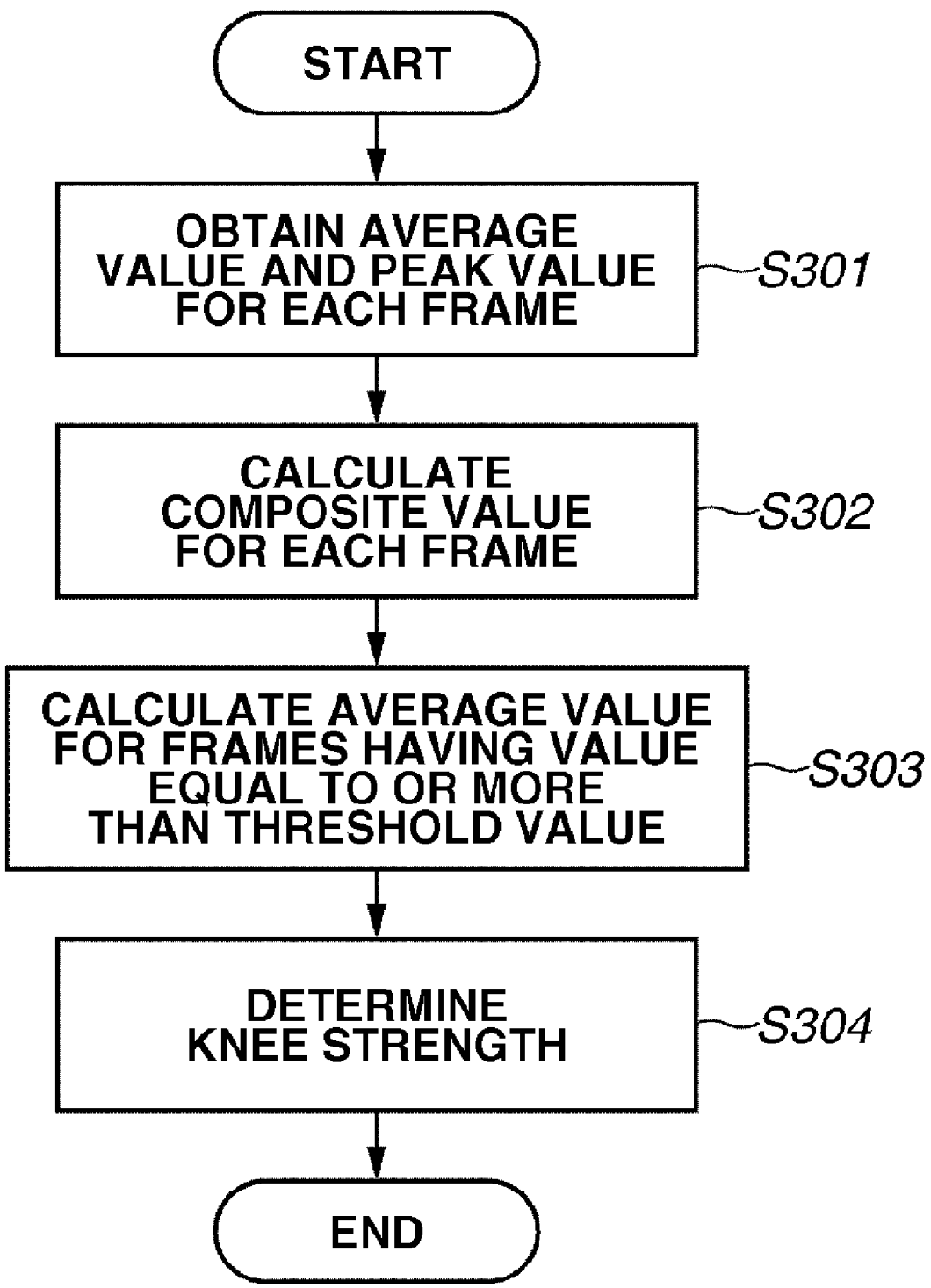
FIG. 3 illustrates an algorithm flow of knee calculation according to the first exemplary embodiment.

Subsequent processing from steps S302 to S304 is similar to that of the first exemplary embodiment illustrated in FIG. 3.

Referring to FIGS. 10A to 10E, specific calculation examples when setting of FIGS. 7A to 7C is performed will be described. FIG. 10A illustrates a result of calculating an average value for each light-metering frame, and FIG. 10B illustrates a result of calculating a peak value for each light-metering frame.

From FIG. 10B, a peak value corresponding to an average value light-metering frame is obtained as illustrated in FIG. 10C. From these peak values, a composite value for each average value light-metering frame is obtained as illustrated in FIG. 10D. For example, in the case of an average value light-metering frame of a 0th row and a 0th column, a corresponding peak value light-metering frame is that of a 0th row and a 0th column. Thus, an average value is "181" and a corresponding peak value is "229", resulting in a composite value "410".

When a threshold value is set to 380, the light-metering frames having composite values exceeding the threshold value are as illustrated in FIG. 10E. In other words, there are seven light-metering frames of a 0th row and a 0th column, a 0th row and a 1st column, a 0th row and a 4th column, a 0th row and a 5th column, a 1st row and a 4th column, a 2nd row and 2nd column, and a 2nd row and a 5th column.

The knee calculation circuit 611 averages these results. In other words, the knee calculation circuit 611 obtains "(410+444+401+446+386+389+390)/7=408.86". This value is within the range of "390<Ta<410" in the Table 1, and hence knee strength is determined to be "middle".

As described above, according to the present exemplary embodiment, a peak value light-metering frame is set by combining a predetermined number of average value light-metering frames. As a result, storage capacity for storing a peak value light-metering result can be reduced.

When the value of the average value light-metering frame is associated with the value of the peak value light-metering frame, the peak value can be multiplied by the coefficient defined corresponding to its position. As a result, which overexposure on the screen should importantly be corrected can be adjusted.

A third exemplary embodiment is directed to a case where, as calculation processing for each light-metering frame, a peak threshold value is set for luminance peak values, and a luminance average value of the light-metering frames having luminance peak values equal to or more than the peak threshold value is selected to be used as a calculation processing result.

In the present exemplary embodiment, a block configuration for the light-metering frame setting is similar to that of the first exemplary embodiment. However, a knee calculation circuit 110 is different in function from that of the first exemplary embodiment. Knee strength to be set is calculated by a calculation method described below. Frame setting of this exemplary embodiment is performed based on the division illustrated in FIGS. 2A and 2B as in the case of the first exemplary embodiment.

Figure 11:
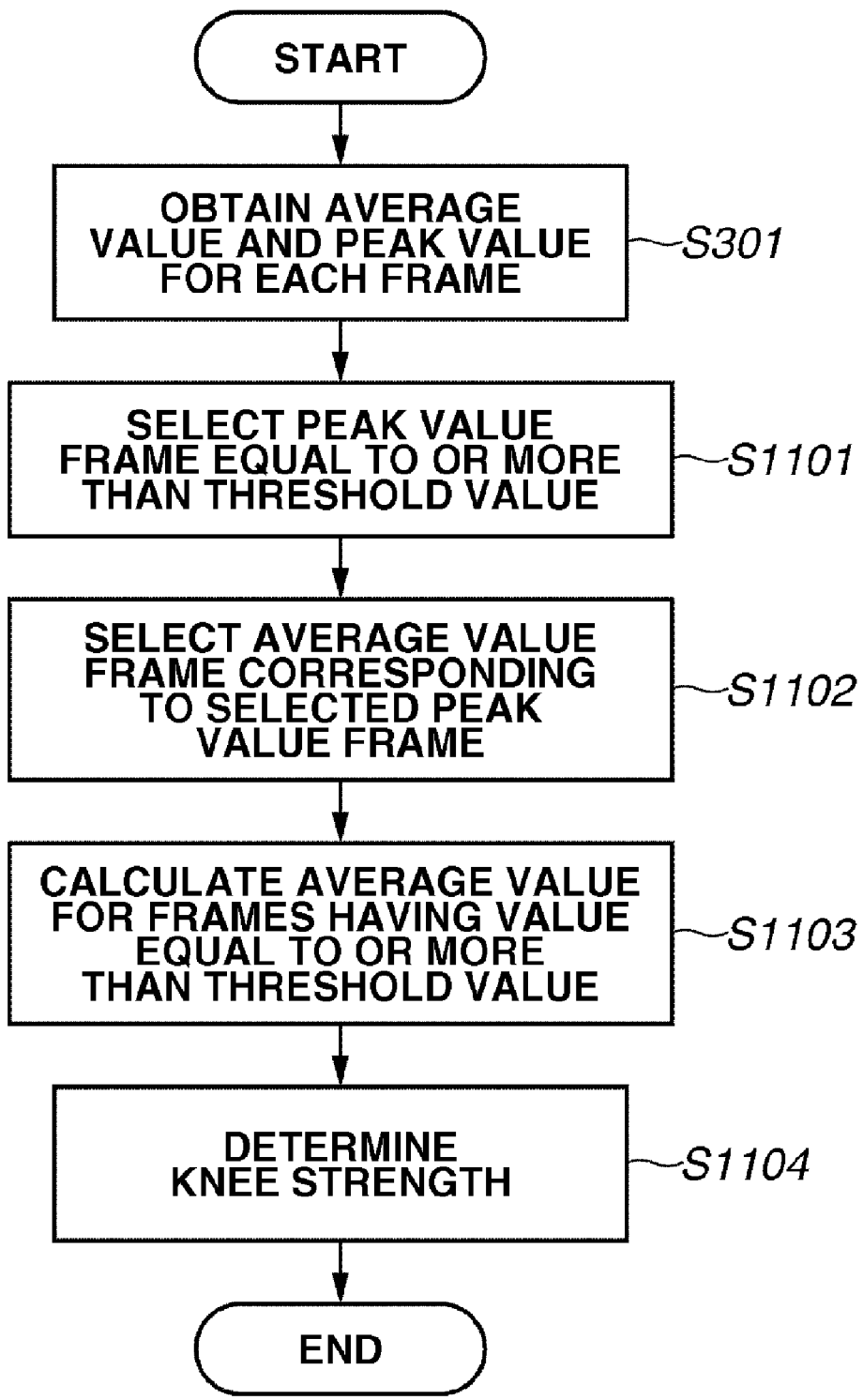
FIG. 11 is a flowchart illustrating an algorithm of knee calculation according to a third exemplary embodiment of the present invention.

Next, referring to a flowchart of FIG. 11, a procedure of knee strength calculation processing performed by the knee calculation circuit 110 will be described. In FIG. 11, steps similar to those of the procedure of FIG. 3 are denoted by the same numbers.

First, in step S301, as in the case of the first exemplary embodiment, a luminance average circuit 108 and a luminance peak circuit 109 obtain an average value and a peak value of luminance signals for each light-metering frame. In step S1101, the knee calculation circuit 110 checks values of peak value light-metering frames to select the light-metering frames having a peak value equal to or more than a predetermined threshold value.

In step S1102, the knee calculation circuit 110 selects an average value light-metering frame corresponding to the selected peak value light-metering frame. In other words, the knee calculation circuit 110 selects only the average value light-metering frame corresponding to the selected peak frame among all average value light-metering frames, and average value light-metering frames within this range are determined to be a target for processing thereafter.

In FIGS. 2A and 2B, for example, when a peak value of a peak value light-metering frame of a 0th row and a 0th column is equal to or more than a predetermined threshold value, the knee calculation circuit 110 selects an average value light-metering frame corresponding to this frame, i.e., an average value light-metering frame of a 0th row and a 0th column.

In step S1103, the knee calculation circuit 110 extracts frames having average light-metering values equal to or more than a predetermined threshold value among the selected average value light-metering frames, and calculates an average value of the average light-metering values of the extracted frames.

When the selected average value light-metering frames include n frames having average light-metering values equal to or more than a predetermined threshold value Th1 if an average light-metering value of an i-th row and a j-th column is Aij, an average value Tb thereof can be calculated by the following expression (4):

$$Tb = \left( \sum_{A_{ij} > Tb3} A_{ij} \right) / n \quad (4)$$

In step S1104, the knee calculation circuit 110 determines knee strength from the calculated average value Tb. For example, by using Table 2 below, the knee calculation circuit 110 sets a scale of knee strength to none, low, middle, and high.

TABLE 2

| Average value range | Knee strength |
|---|---|
| 0 ≦ Tb < 140 | None |
| 140 ≦ Tb < 170 | Low |
| 170 ≦ Tb < 190 | Middle |
| 190 ≦ Tb | High |

The knee calculation circuit 110 transmits the determined knee strength to a knee control circuit 111. The knee control circuit 111 uses the knee strength for controlling knee processing of a knee processing circuit 112.

Referring to FIGS. 12A to 12E, specific calculation examples performed by the knee calculation circuit 110 will be described.

In FIGS. 12A to 12E, as in the case of FIGS. 2A and 2B, average value light-metering frames and peak value light-metering frames are set in an image. FIG. 12A illustrates a result of calculating an average value for each light-metering frame in the image, and FIG. 12B illustrates a result of calculating a peak value for each light-metering frame.

When a peak threshold value is set to "200", peak value light-metering frames exceeding the peak threshold value in FIG. 12B are obtained as illustrated in FIG. 12C. In other words, among peak value frames, peak value frames of a 0th row and a 0th column, a 0th row and a 1st column, a 0th row and a 4th column, a 1st row and a 4th column, a 1st row and a 5th column, a 2nd row and a 2nd column, a 2nd row and a 5th column, a 3rd row and a 2nd column, and a 3rd row and a 4th column are selected. Average values of corresponding average value light-metering frames are as illustrated in FIG. 12D.

In the case of a predetermined threshold value of Th1=140, frames having values equal to or more than the threshold value are as illustrated in FIG. 12E. In other words, in seven light-metering frames of a 0th row and a 0th column, a 0th row and a 1st column, a 0th row and a 4th column, a 0th row and a 5th column, a 1st row and a 4th column, a 2nd row and a 2nd column, and a 2nd row and a 5th column, average light-metering values equal to or more than the threshold value Th1 are obtained.

The knee calculation circuit 110 averages these results. In other words, the knee calculation circuit 110 obtains "(181+211+175+220+160+170+162)/7=182.71". This average value is within the range of "170<Tb<190" in the Table 2, and hence the knee calculation circuit 110 determines knee strength to be "middle".

Figure 13:
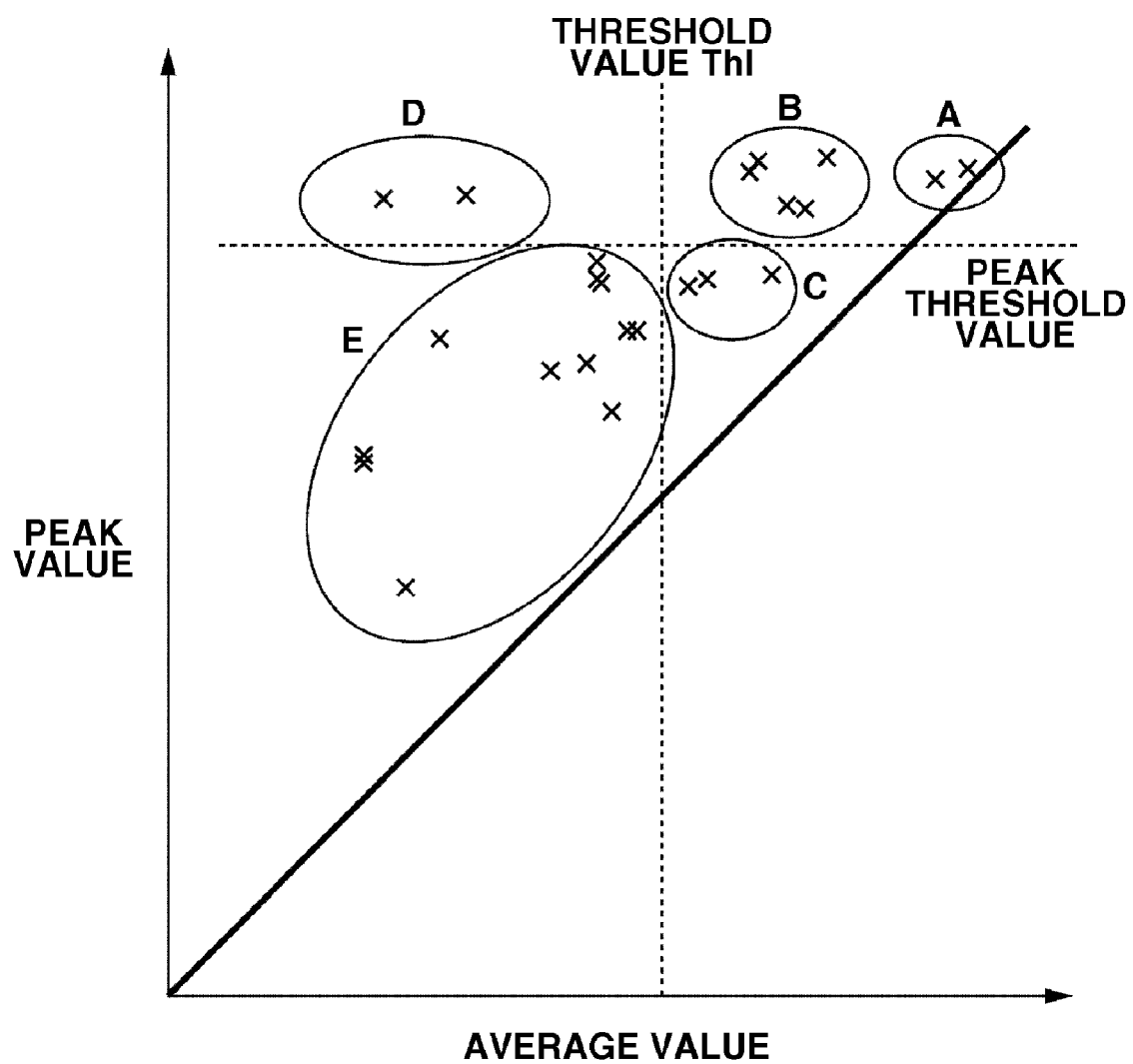
FIG. 13 illustrates relationship between an average value and a peak value according to the third exemplary embodiment.

Next, referring to FIG. 13, characteristics of an overexposure detection effect according to the present exemplary embodiment will be described. Different from FIG. 5, FIG. 13 includes a peak threshold value and a threshold value Th1 for average light-metering values. As in the case of FIG. 5, a horizontal axis indicates an average value, and a vertical axis indicates a peak value. Each light-metering frame has a value "X".

In the present exemplary embodiment, the knee calculation circuit 110 selects ranges A, B, and D based on the peak threshold value. Then, the knee calculation circuit 110 selects the ranges A and B for average light-metering values based on the threshold value Th1. In other words, the knee calculation circuit 110 excludes ranges such as C and E where no image overexposure may occur based on the peak threshold value.

The knee calculation circuit 110 excludes a range D where average values are low while only peak values are high based on the threshold value for the average light-metering values. Thus, in the present exemplary embodiment, setting the two threshold values, i.e., the peak threshold value and the threshold value for the average light-metering values, enables efficient detection of a range of an overexposed image.

Moreover, the use of the average value for the average light-metering values of the detected frames enables balanced knee strength setting for the frame detected from the range A and the frame detected from the range B.

As described above, according to the present exemplary embodiment, a plurality of light-metering frames are set on the screen, and a luminance average value and a luminance peak value are calculated for each light-metering frame. A peak threshold value is set for luminance peak values, luminance average values of light-metering frames having luminance peak values equal to or more than the peak threshold value are selected, an average value is obtained for the selected luminance average values, and knee strength is set based on the obtained average value. As a result, in the case of an image where greater overexposure occurs than that of conventional case, gradation improvement by knee processing is achieved more easily.

In each of the exemplary embodiments, the average value and the peak value are simultaneously obtained from the light-metering frame of one image. However, the average value and the peak value can be obtained from the light-metering frame in a time-division manner.

In the case of a moving image that includes a plurality of frames, even when an average value and/or a peak value are obtained across the frames, equal knee strength can be set. For example, in one frame period of time, a luminance average value and a luminance peak value of a certain light-metering frame are obtained and, by changing a position of a light-metering frame to be subjected to light-metering between frames, a value of a light-metering frame of one screen can be obtained.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-001732 filed Jan. 7, 2009, which is hereby incorporated by reference herein in its entirety.

What is claimed is:

1. An image processing apparatus comprising:
a luminance value calculation unit configured to calculate a luminance average value and a luminance peak value from an image obtained by image-capturing, for each of frames formed by dividing one screen;
a first calculation unit configured to perform combining processing for combining the luminance average value and the luminance peak value obtained for each of the frames to obtain composite values;
a second calculation unit configured to calculate an average value of the composite values equal to or more than a predetermined threshold value from among the composite values obtained by the first calculation unit; and
a setting unit configured to set knee strength based on the average value of the composite values obtained by the second calculation unit.

2. The image processing apparatus according to claim 1, wherein the first calculation unit is configured to combine the luminance average value and the luminance peak value of each of the frames by multiplying the respective values with a predetermined coefficient.

3. The image processing apparatus according to claim 2, wherein the first calculation unit is configured to set the predetermined coefficient to 1.

4. The image processing apparatus according to claim 1, wherein the luminance value calculation unit is configured to calculate the luminance average value and the luminance peak value based on a light-metering frame for the luminance average value and a light-metering frame for the luminance peak value having sizes different from each other.

5. The image processing apparatus according to claim 4, wherein the light-metering frame for the luminance peak value has a shape formed by combining a plurality of frames for the luminance average value.

6. The image processing apparatus according to claim 5, wherein the light-metering frame for the luminance peak value includes frames having shapes different from each other.

7. The image processing apparatus according to claim 5, wherein the light-metering frame for the luminance peak value has a shape formed by combining a predetermined number of frames for the luminance average value in a vertical direction with a predetermined number of frames for the luminance average value in a horizontal direction.

8. The image processing apparatus according to claim 5, wherein the combining processing is performed for each frame for an average value.

9. The image processing apparatus according to claim 1, wherein the luminance value calculation unit is configured to perform processing for obtaining an average value of peak values equal to or more than a predetermined peak threshold value among the calculated luminance peak values.

10. The image processing apparatus according to claim 1, wherein the luminance value calculation unit is configured to calculates a luminance average value and a luminance peak value of one screen by using a plurality of frame images.

11. An image processing method comprising:
calculating a luminance average value and a luminance peak value from an image obtained by image-capturing for each of frames formed by dividing one screen;
combining the luminance average value and the luminance peak value obtained for each of the frames to generate a composite value;
calculating an average value of the composite values equal to or more than a predetermined threshold value among the composite values; and
setting knee strength based on the average value of the composite values.

* * * * *